(12) United States Patent
Ko

(10) Patent No.: US 9,312,958 B2
(45) Date of Patent: Apr. 12, 2016

(54) OPTICAL COMMUNICATION TRANSMITTING DEVICE AND METHOD OF MANUFACTURING THE SAME

(71) Applicant: Photon Chip, Inc., County of New Castle, DE (US)

(72) Inventor: Cheng-Hao Ko, Hsinchu County (TW)

(73) Assignee: Cheng-Hao Ko, Hsinchu County (TW)

( * ) Notice: Subject to any disclaimer, the term of this patent is extended or adjusted under 35 U.S.C. 154(b) by 113 days.

(21) Appl. No.: 13/776,302

(22) Filed: Feb. 25, 2013

(65) Prior Publication Data

US 2013/0223852 A1  Aug. 29, 2013

Related U.S. Application Data

(60) Provisional application No. 61/603,252, filed on Feb. 25, 2012.

(51) Int. Cl.
| | |
|---|---|
| G02B 6/26 | (2006.01) |
| H04B 10/50 | (2013.01) |
| G02B 6/42 | (2006.01) |
| G02B 6/28 | (2006.01) |
| G02B 6/43 | (2006.01) |

(52) U.S. Cl.
CPC ............... H04B 10/501 (2013.01); G02B 6/28 (2013.01); G02B 6/4214 (2013.01); G02B 6/43 (2013.01)

(58) Field of Classification Search
None
See application file for complete search history.

(56) References Cited

U.S. PATENT DOCUMENTS

| | | | | |
|---|---|---|---|---|
| 5,636,298 | A * | 6/1997 | Jiang et al. | 385/14 |
| 6,157,760 | A * | 12/2000 | Fujita et al. | 385/49 |
| 8,805,139 | B2 * | 8/2014 | Huang | 385/42 |

* cited by examiner

*Primary Examiner* — Sung Pak
(74) *Attorney, Agent, or Firm* — Raymond Y. Chan; David and Raymond Patent Firm

(57) ABSTRACT

An optical communication transmitting device includes a substrate, a first layer with a first optical refractive index formed on the substrate, a waveguide unit formed with a second optical refractive index formed on the first layer, and a second layer with a third optical refractive index covered on the top of the waveguide unit. The second optical refractive index is greater than the first optical refractive index. The second optical refractive index is greater than the third optical refractive index. The waveguide unit is formed from a photoresistor layer by a high energy light source exposure.

6 Claims, 5 Drawing Sheets

OPTICAL COMMUNICATION TRANSMITTING DEVICE AND METHOD OF MANUFACTURING THE SAME

CROSS REFERENCE OF RELATED APPLICATION

This is a non-provisional application that claims the benefit of priority under 35 U.S.C. §119 to a non-provisional application, application No. 61/603,252, filed Feb. 25, 2012.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention generally relates to an optical transmitter, more particularly to an optical communication transmitting device in a SoC (system on chip) for reducing the size and cost of the device.

2. Description of Related Arts

With bandwidths of up to 10 Gb/s have been demonstrated the practical upper limit of such a system has not yet been determined, optical communication systems are fast-growing areas in communication networks. The "optical communication system" pertains to any system that uses optical signals to convey information across an optical waveguide medium, such as an optical fiber. An optical waveguide generally consists of a core section configured to propagate an optical carrier signal within the core, and a cladding section surrounding the entire periphery of the core section. Optical elements employing such an optical waveguide include, i.e., an optical power splitter/coupler for splitting or coupling the optical power of the optical signals, and a wavelength division multiplexer/demultiplexer for multiplexing or demultiplexing multiple channels of the optical signal according to the wavelengths selected. A Y-branched optical waveguide is typically used for splitting optical power, and includes an input waveguide for receiving the optical signal, a fiber waveguide for extending the transfer mode of the input optical signal, and a pair of output waveguides for branching out the optical power of the extended optical signal to provide the branched optical power as an output optical signal.

Nowadays, optical elements, such as optical waveguides, are made of optical fibers. Therefore, the size and cost of the optical waveguides are not effective. According to the drawbacks aforementioned, the present invention provides an optical communication transmitting device and method of manufacturing the same for reducing the size and cost of the device.

U.S. Pat. No. 5,633,966 discloses a method for forming refractive index distribution in light transmission path, and optical filter and method of using the same. The method comprises the steps of comprising the steps of: (a) preparing a light transmission path including a core and a cladding layer; (b) applying a photosensitive material layer onto a surface of said cladding layer; (c) patterning said photosensitive material layer by photolithography thereby forming a mask pattern; and (d) irradiating said light transmission path with an X-ray through said mask pattern, thereby forming in said core a refractive index fluctuation distribution corresponding to said mask pattern. The method teaches the way for forming refractive index distribution in light transmission path by photolithography and X-ray irradiating, but the method dos not teaches the way for forming waveguides.

U.S. Pat. No. 5,915,051 discloses a wavelength-selective optical add/drop switch. The wavelength-selective optical switch comprises: a first input port for accepting a plurality of copropagating optical channels, a first output port, a second output port, wavelength-selective optical filter means connected to receive the copropagating optical channels from the first input port to extract a selected one of the channels while allowing remaining channels to copropagate to the first output port, and an interferometric switch connected to receive the selected extracted channel. The switch is a waveguide for transmitting optical signals with different wavelengths. However, the size and cost of the switch is not benefit.

SUMMARY OF THE PRESENT INVENTION

An objective of the present invention is to provide an optical communication transmitting device with small size and lower cost.

For achieving above objectives, the present invention is to provide an optical communication transmitting device, comprising: a substrate; a first layer with a first optical refractive index n1 formed on the substrate; a waveguide unit with a second optical refractive index nw formed on top of the first layer, wherein the second optical refractive index nw of the waveguide is greater than first optical refractive index n1; and a second layer with a third optical refractive index n2 covered on the top of the waveguide unit, wherein the second optical refractive index nw of the waveguide is greater than the third optical refractive index n2; wherein the waveguide unit is formed from a photo-resistor layer by a high energy light source exposing.

Another embodiment of the present invention is to provide a method of manufacturing an optical communication transmitting device, the method comprising the steps of: (a) providing a substrate; (b) forming a first layer, with a first optical refractive index n1, on the substrate; (c) forming a photo-resist layer on the first layer; (d) exposing the photo-resistor layer by a high energy light source; (e) developing the photo-resistor layer for forming a waveguide unit, wherein the waveguide unit possesses a second optical refractive index nw which is greater than the first optical refractive index n1; and (f) covering a second layer, with a third optical refractive index n2, on the top of the waveguide unit, wherein the second refractive index nw of the waveguide is greater than third optical refractive index n2.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE PREFERRED EMBODIMENT

Figure 1:
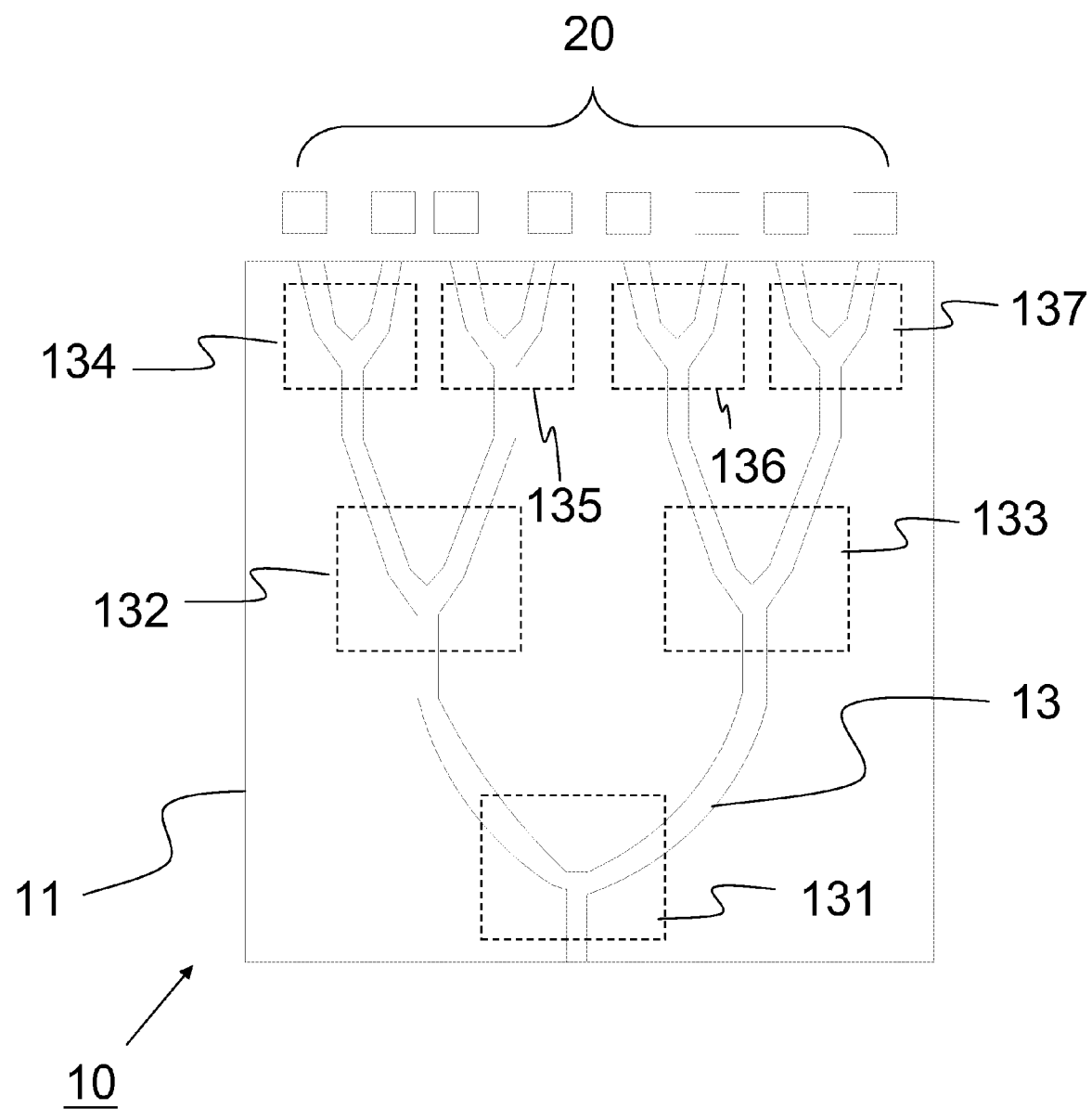
FIG. 1 illustrates a hint diagram of the optical communication transmitting device of the present invention.

Referring to FIG. 1, FIG. 1 illustrates a hint diagram of the optical communication transmitting device 10 of the present invention. The device 10 substantially comprises a substrate 11 and a waveguide unit 13. The substrate 11 is a semiconductor substrate, a glass substrate, a metal substrate or a plastic substrate. The waveguide unit 13 is formed on the substrate 11 and includes a plurality of Y-branching units 131-137. Each of the Y-branching units 131-137 has a first terminal, a second terminal and a third terminal. The first terminals of the Y-branching units 132 and 133 are connected to the second terminal and third terminal of the Y-branching unit 131, respectively. The first terminals of the Y-branching units 134, 135, 136 and 137 are connected to the second terminal and third terminal of the Y-branching units 132 and 133, respectively. Thus, the optical communication transmitting device 10 is used for one-to-eight optical wavelength splitter.

Light beams inputted from the first terminal of the Y-branching unit 131 are split by the Y-branching units 131 to 137 and outputted from the second terminal and third terminal of the Y-branching units 134 to 137, respectively. In this mode of operation, 20 is a beam receiver (for example, a photodiode array) and then receives the light beams outputted from the second terminal and third terminal of the Y-branching units 134 to 137. In another mode, 20 provides light beams with different wavelengths and acts as a beam emitter (for example, a laser diode array with wavelengths of 800 nm, 805 nm, 810 nm, etc.) to the second terminal and third terminal of the Y-branching units 134 to 137, respectively. The light beams of different wavelengths (for example, 800 nm and 805 nm, 810 nm and 815 nm, etc.) are coupled by the Y-branching units 131 to 137 and outputted from the first terminal of the Y-branching unit 131. Thus, the optical communication transmitting device 10 of the present invention works as a bidirectional optical communication transmitter. Moreover, the waveguide unit 13 is a 2×1, 3×1, 4×1 or N×1 coupler. N is an integer.

Figure 2A:
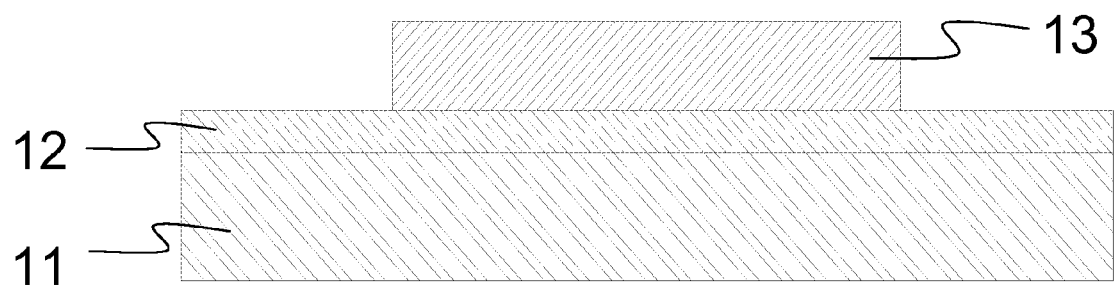
FIG. 2(a) to FIG. 2(f) illustrate the processes for manufacturing the optical communication transmitting device of the present invention.
Figure 2B:
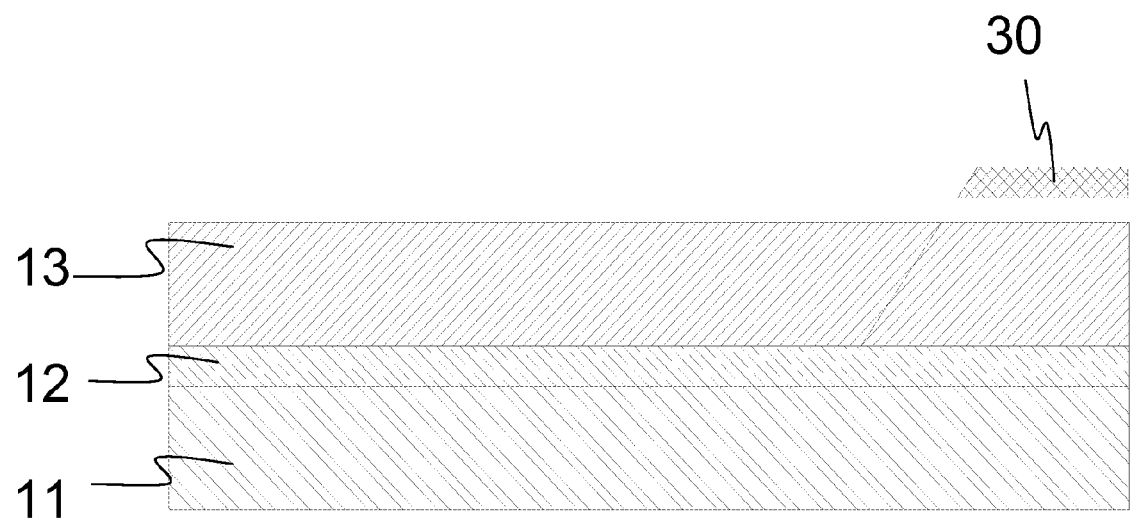
Figure 2C:
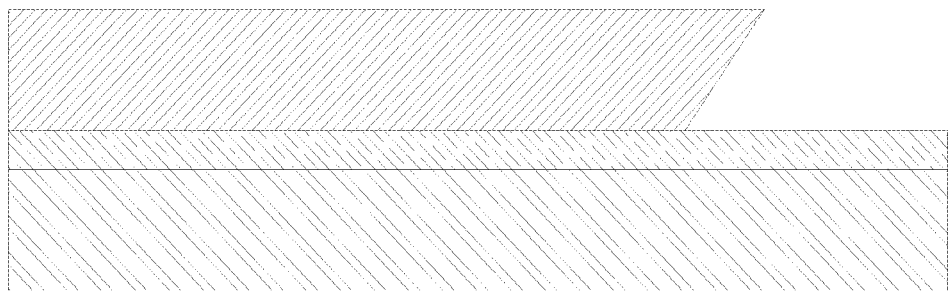
Figure 2D:
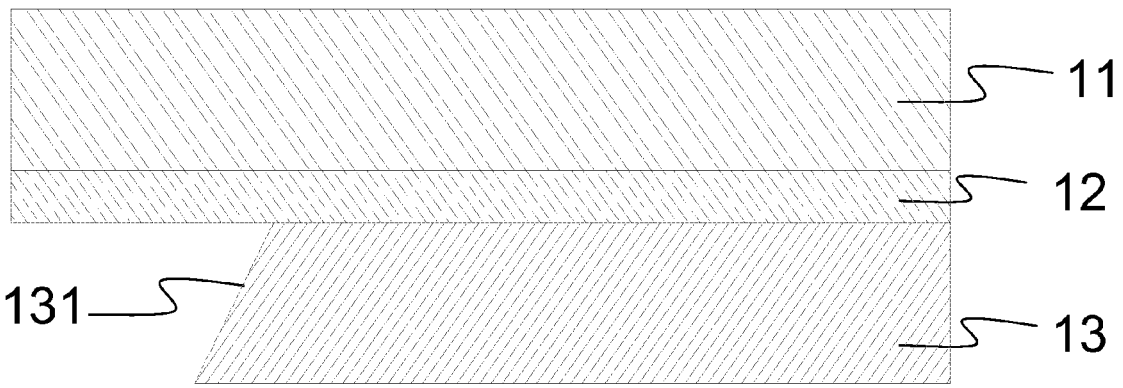
Figure 2E:
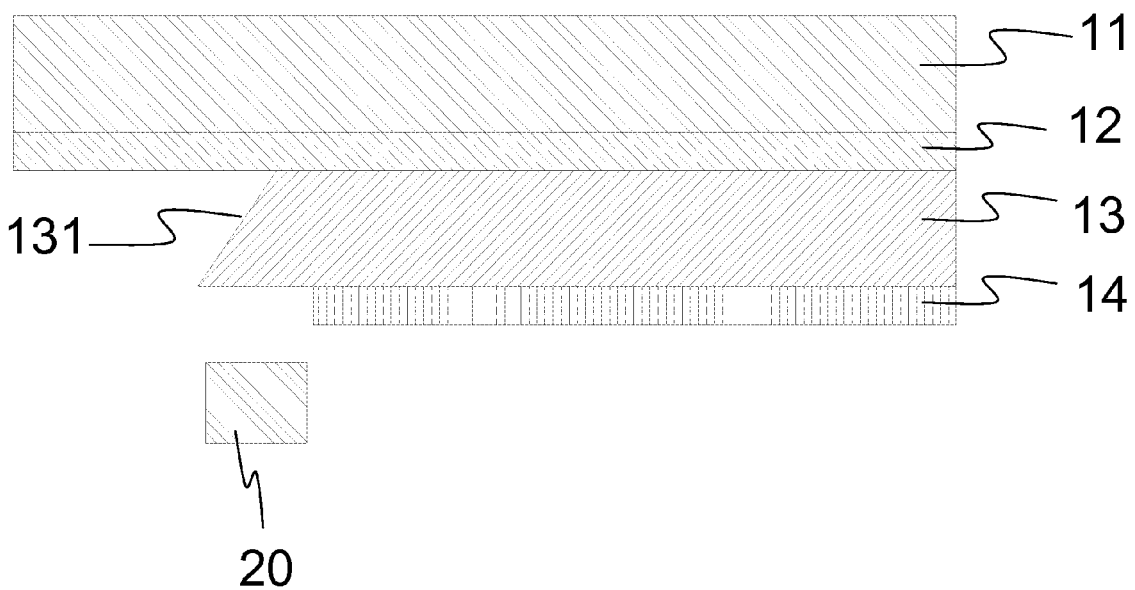
Figure 2F:
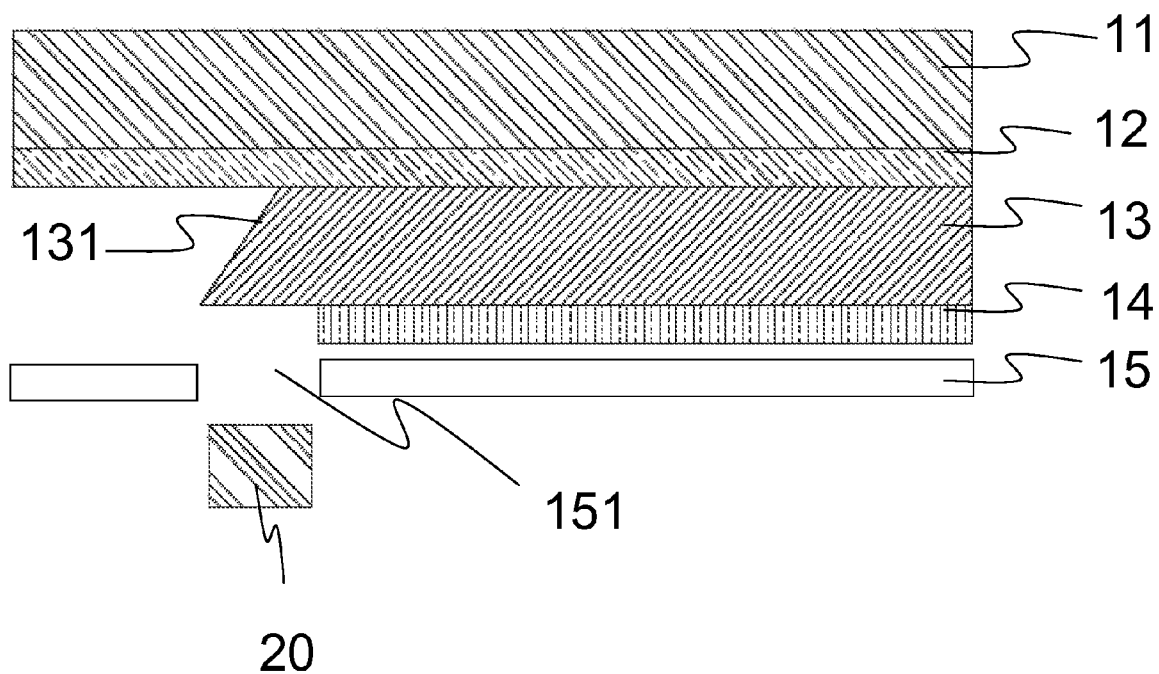

As shown in FIG. 2(e), the optical communication transmitting device 10 comprises a substrate 11, a first layer 12 and a waveguide unit 13. The first layer 12 is formed on the substrate 11. The waveguide unit 13 with a second optical refractive index nw (for example, nw=1.5) is formed on the first layer 12. The first layer 12 is a dielectric layer, made of polymer, Si3N4 or SiO2, with a first optical refractive index n1 (for example, n1=1.3). The second optical refractive index nw is greater than first optical refractive index n1 (nw>n1). Therefore, light beams in the waveguide unit 13 will be reflected within the waveguide unit 13 due to the total internal reflection effect. Or, if the first layer 12 is a metal layer, such as Al or Au, with high reflectivity, light beams in the waveguide unit 13 will be reflected from the contacting area between the waveguide unit 13 and the first layer 12 (metal reflection).

The optical communication transmitting device 10 further comprises a second layer 14 for improving light beams transmitting in the waveguide unit 13 and avoiding light beams exiting from the waveguide unit 13. The second layer 14 is a dielectric layer, made of polymer, Si3N4 or SiO2, with a third optical refractive index n2 (for example, n2=1.3), covered on the top of the waveguide unit 13. The second optical refractive index nw is greater than the third optical refractive index n2 (nw>n2). Therefore, light beams in the waveguide unit 13 will be fully reflected within the waveguide unit 13 and are transmitted in the waveguide unit 13 due to total internal reflection effect. Or, if the second layer 14 is a metal layer, such as Al or Au, with high reflectivity, light beams in the waveguide unit 13 will be reflected from the contacting area between the waveguide unit 13 and the second layer 14 (metal reflection).

Moreover, the waveguide unit 13 is formed from a photo-resistor layer by a high energy light source exposing. The high energy light source can be X-ray, soft X-ray or EUV (extreme UV). The wavelength of X-ray is from 0.1 nm to 1 nm. Besides, the material of the photo-resist layer is, for example, SU-8 or PMMA.

FIG. 2(a) to FIG. 2(f) illustrate the processes for manufacturing the optical communication transmitting device 10 of the present invention. As shown, for manufacturing the optical communication transmitting device, firstly, a substrate 11 with thickness between 500 um to 5 mm, such as semiconductor substrate with thickness between 500 um to 700 um, glass substrate with thickness about 500 um, metal substrate or plastic substrate, is provided and a first layer 12, such as a dielectric layer made of SiO2 or Si3N4 or polymer with an optical refractive index n1 or a high reflectivity metal layer made of Au or Al, is formed on the substrate 11. Then, a photo-resist layer 13 with a second optical refractive index nw and thickness about 10 um-500 um is formed on the first layer 12. The waveguide unit, as shown in FIG. 1, will be formed from the photo-resist layer 13, and the material of the photo-resist layer 13 is, for example, SU-8 or PMMA. The second optical refractive index nw of the photo-resist layer 13 is greater than the first optical refractive index n1.

Then, the photo-resist layer 13 is exposed by high energy light source (for example, X-ray) through a first high-energy-light-source (X-ray) mask (not shown). If the optical communication transmitting device 10 of the present invention receives a horizontal direction coupling input, a second layer 14, such as a dielectric layer made of SiO2 or Si3N4 or polymer with a third optical refractive index n2 or a high reflectivity metal layer made of Au or Al, is covered on the top of the photo-resist layer (waveguide unit) 13. The second optical refractive index nw of the photo-resist layer (waveguide unit) 13 is greater than third optical refractive index n2. Therefore, input light beams provided to the photo-resist layer (waveguide unit) 13 in horizontal direction will be transmit-reflected (total internal reflection) within the photo-resist layer (waveguide unit) 13.

If the optical communication transmitting device 10 of the present invention receives a vertical direction coupling input, the photo-resist layer 13 is exposed by high energy light source (for example, X-ray) through a second first high-energy-light-source (X-ray) mask 30 at first for forming an inclined plane 131 and then exposed by high energy light source (for example, X-ray) through the first high-energy-light-source (X-ray) mask (not shown). Finally, a second layer 14 with the third optical refractive index n2 is covered on the top of the photo-resist layer (waveguide unit) 13. The second optical refractive index nw of the photo-resist layer (waveguide unit) 13 is greater than the third optical refractive index n2. Therefore, input light beams provided from the transceiver 20 to the photo-resist layer (waveguide unit) 13 in vertical direction are reflected by the inclined plane 131 and then transmit-reflected within the photo-resist layer (waveguide unit) 13.

In FIG. 2(*f*), when the transceiver (as a receiver) 20 receives light beams reflected from the inclined plane 131 of the waveguide unit 13, for restricting the light beams within the reception range of the transceiver 20, a light shield 15 with at least one opening 151 is provided between the second layer 14 (or the waveguide unit 13) and the transceiver 20. At least one opening 151 is facing the transceiver 20. The light beams reflected from the inclined plane 131 of the waveguide unit 13 are partially blocked by the light shield 15 and partially received by the transceiver 20 through the opening 151. Therefore, the light beams reflected from the inclined plane 131 of the waveguide unit 13 are concentrated.

Due to the limitation of the bending radius of the optical fiber, the size of the optical waveguide is large and the cost is very expensive. Since the optical waveguide unit of the present invention is formed by lithographic manufacture processes, the problem of optical fiber radius of bending is solved and the cost and the size are reduced.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An optical communication transmitting device, comprising:
    a substrate;
    a first layer having a first optical refractive index formed on the substrate;
    a waveguide unit having a second optical refractive index formed on top of the first layer, such that the first layer is positioned between the substrate and the first layer, wherein the waveguide unit is formed from a photo-resistor layer by a high energy light source exposure, wherein the waveguide unit has an inclined reflecting surface formed at an end portion thereof for aligning with a light beam receiver, such that due to the total internal reflection of the waveguide unit, light beams in the waveguide unit are reflected therewithin and are outputted to the light beam receiver when the light beams are reflected by the inclined reflecting surface;
    a second layer, having a third optical refractive index, covered on the top of said waveguide unit such that the waveguide unit is positioned between the first layer and the second layer, wherein the second optical refractive index of the waveguide unit is greater than the first optical refractive index of the first layer, and the second optical refractive index is greater than the third optical refractive index of the second layer; and
    a light shield provided between the second layer and the light beam receiver such that the second layer is positioned between the waveguide unit and the light shield, wherein the light shield has at least an opening facing toward the light beam receiver, such that the light beams reflected from the inclined reflecting surface are partially blocked by the light shield and are partially passing through the opening to the light beam receiver, so as to concentrate the light beams from the inclined reflecting surface to the light beam receiver.

2. The optical communication transmitting device, as recited in claim 1, wherein the first metal layer is made of Al or Au, with high reflectivity, such that the light beams within the waveguide unit are reflected from a contacting area between the waveguide unit and the first layer for ensuring the total internal reflection of the waveguide unit.

3. The optical communication transmitting device, as recited in claim 1, wherein the first layer has a thickness of 500 um-5 mm, and the waveguide unit has a thickness of 10 um-500 um.

4. A method of manufacturing an optical communication transmitting device, comprising the steps of:
    (a) providing a substrate;
    (b) forming a first layer on the substrate, wherein the first layer has a first optical refractive index;
    (c) forming a waveguide unit, which has a an inclined reflecting surface formed at an end portion thereof for aligning with a light beam receiver, by exposing a photo-resistor layer by a high energy light source, wherein said waveguide unit has a second optical refractive index greater than the first optical refractive index of the first layer, wherein due to the total internal reflection of the waveguide unit, light beams in the waveguide unit are reflected therewithin and are outputted to the light beam receiver when the light beams are reflected by the inclined reflecting surface;
    (d) providing the waveguide unit on top of the first layer, such that the first layer is positioned between the substrate and the first layer;
    (e) forming a second layer, having a third optical refractive index, on top of the waveguide unit such that the waveguide unit is positioned between the first layer and the second layer, wherein the second optical refractive index is greater than the third optical refractive index of the second layer;
    (f) providing a light shield, having an opening, between the second layer and the transceiver such that the second layer is positioned between the waveguide unit and the light shield; and
    (g) aligning the opening of the light shield to face toward the light beam receiver, such that the light beams reflected from the inclined reflecting surface are partially blocked by the light shield and are partially passing through the opening to the light beam receiver, so as to concentrate the light beams from the inclined reflecting surface to the light beam receiver.

5. The method, as recited in claim 4, wherein the first metal layer is made of Al or Au, with high reflectivity, such that the light beams within the waveguide unit are reflected from a contacting area between the waveguide unit and the first layer for ensuring the total internal reflection of the waveguide unit.

6. The method, as recited in claim 4, wherein the first layer has a thickness of 500 um-5 mm, and the waveguide unit has a thickness of 10 um-500 um.

* * * * *